United States Patent [19]
Kornylak

[11] 3,964,588
[45] June 22, 1976

[54] CONVEYOR HAVING PROVISION FOR DISCHARGING LOADS AT AN ANGLE GENERALLY TRANSVERSE TO THE LINE OF TRAVEL OR THE CONVEYOR

[75] Inventor: Andrew T. Kornylak, Hamilton, Ohio

[73] Assignee: Kornylak Corporation, Hamilton, Ohio

[22] Filed: Aug. 6, 1970

[21] Appl. No.: 61,789

Related U.S. Application Data
[62] Division of Ser. No. 667,492, Sept. 13, 1967, Pat. No. 3,550,756.

[52] U.S. Cl. .............................. 193/36; 193/35 MD; 193/37; 198/127 R
[51] Int. Cl.² ................... B65G 13/10; B65G 39/02
[58] Field of Search .............................. 193/35–37; 198/105, 127 R, 183, 81

[56] References Cited
UNITED STATES PATENTS
| | | |
|---|---|---|
| 1,123,851 | 1/1915 | Cooper..................... 193/35 MD X |
| 2,158,482 | 5/1939 | Maltby............................. 198/127 R |
| 3,020,993 | 2/1962 | Heinrich et al............ 193/35 MD X |
| 3,356,236 | 12/1967 | Shaw et al................. 193/35 MD X |
| 3,363,735 | 1/1968 | Hotchkiss............................ 193/37 |
| 3,370,685 | 2/1968 | Guilie .................................. 193/36 |
| 3,484,655 | 12/1969 | Peltier............................. 198/81 X |

FOREIGN PATENTS OR APPLICATIONS
| | | |
|---|---|---|
| 629,604 | 11/1927 | France................................. 193/36 |
| 211,992 | 4/1967 | Sweden........................ 193/35 MD |

Primary Examiner—Evon C. Blunk
Assistant Examiner—James L. Rowland
Attorney, Agent, or Firm—Thomas E. Beall, Jr.

[57] ABSTRACT

Conveyors, having associated therewith means to divert loads from the normal line of travel, have means thereon to reduce the drag of the loads on the conveyor elements at the point of diversion. A diverter element is sometimes positioned adjacent the path of travel of a load and is provided with antifriction means on its face to reduce the friction of the load in changing its direction of travel. Antifriction means is provided on conveyor elements, either in the surface of a belt conveyor, or in the peripheral surface of conveyor rollers, which means is so arranged that it tends to cause a load to partake of motion in two directions at an angle to each other, the resultant of which is a path substantially normal to the line of travel on the conveyor.

10 Claims, 32 Drawing Figures

CONVEYOR HAVING PROVISION FOR DISCHARGING LOADS AT AN ANGLE GENERALLY TRANSVERSE TO THE LINE OF TRAVEL OR THE CONVEYOR

This is a division of application Ser. No. 667,492, filed Sept. 13, 1967, now U.S. Pat. No. 3,550,756.

This application relates to conveyors, particularly such conveyors as have provision for discharging loads at an angle, generally transverse to the line of travel on the conveyor.

The conveyors used in carrying out this invention may be of the type shown in my prior U.S. Pat. No. 3,082,861 issued Mar. 26, 1963; or they may be roller conveyors of the gravity type or of the type having power-driven rollers.

A conveyor of the type shown in my prior patent, supra, lends itself well to use in connection with the present invention as will appear further along in the following description.

An object of the present invention is the provision of loaddiverting means in a conveyor system whereby the direction of movement of a load on a conveyor may be changed abruptly in passage to another conveyor with greatly reduced friction between the conveyors and the load at the point of diversion.

One particular object of this invention is the provision of a load diverter adjacent a conveyor for moving a load into a path generally transverse to the line of travel on the conveyor, said diverter having antifriction means on the face thereof that is contacted by the load.

Another object of this invention is a roller conveyor wherein at least a portion of the rollers are provided with antifriction means in the peripheral surface thereof which aid a load in a movement generally transverse to its line of travel on the conveyor by reducing the frictional resistance to such movement in such transverse direction.

A further object of this invention is in an endless conveyor of the hingedly interconnected metal plate type wherein the plates are of one or a mixture of a plurality of types each having antifriction means thereon for reducing the frictional resistance to a change of direction of a load thereon under conditions causing it to assume a path of travel substantially transverse to the path of travel with the conveyor.

An additional object of this invention is to reduce the frictional drag of the load on the rollers or bolt of a conveyor, when the load is being diverted from the belt or rollers.

Still another object of this invention is the provision of conveyors substantially normal to one another and having means to divert a load from one to another including means to reduce the frictional drag at the point of change of direction.

These and other objects will appear upon consideration of the following specification taken with the accompanying drawings, and which taken together form a complete disclosure of the invention.

In the drawings, wherein like parts are represented by like characters of reference in the several views.

In the drawings, similar parts of modifications will have numerals increased by 100, 200, etc.

Figure 1:
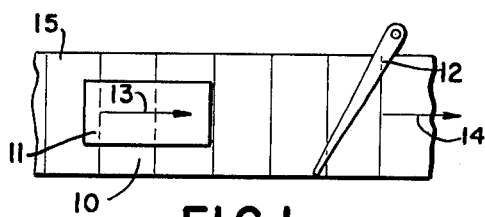
FIG. 1 is a fragmentary plan view of a belt conveyor having a load diverter, as is common in the art.
Figure 2:
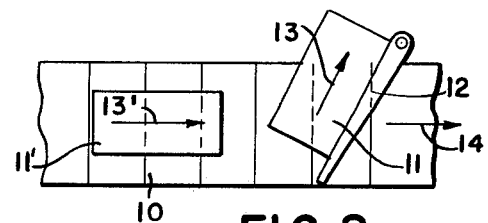
FIG. 2 is a fragmentary plan view of a conveyor as in FIG. 1, showing the action of a load diverter.
Figure 3:
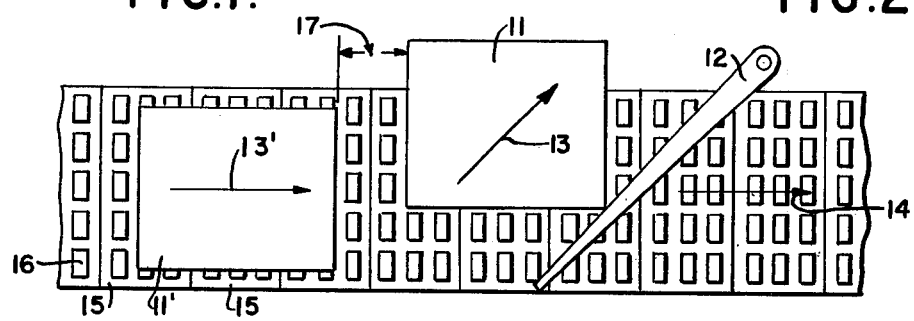
FIG. 3 is a partial plan view of a belt conveyor having interconnected metal plates in which rollers are mounted to assist in diverting the load.

In FIG. 1, a belt conveyor 10 such as the conveyor of my prior U.S. Pat. No. 3,082,861, issued Mar. 26, 1963, is diagrammatically shown having a load 11 thereon, moving in the direction of the arrow 14 and approaching a diverter bar 12. FIG. 2 shows the action when the load 11 reaches the diverter bar 12. It turns so that, in this case, one of its long sides engages the bar 12 and starts to travel in the direction of the arrow 13. Another load 11' is shown moving with the arrow 13' closely following the load 11. In making such a turn and in sliding off the conveyor 10, the load is urged off the belt by the frictional drag thereon, moving in the direction of the arrow 13. The belt at the same time moves under the load, while the load moves relatively slowly, allowing the next load 11' to catch up, creating a jam at the discharge point. In order to avoid such condition, I have devised the conveyor 10, shown in FIG. 3, comprising the interconnected hinged together plates 15 having rollers 16 arranged thereon with their axes generally in the direction of movement of the plates as indicated by the arrow 14. Loads 11, 11' on the conveyor 10 engage the diverter 12, but they do not turn as in FIG. 2. In this case, the load 11 moves in a direction at an angle to the length of the conveyor as indicated by the arrow 13 and rolls easily off the conveyor, upon engagement with the diverter bar 12. The space 17 between loads 11 and 11' must be arranged so that the load 11 will not interfere with load 11'.

Figure 4:
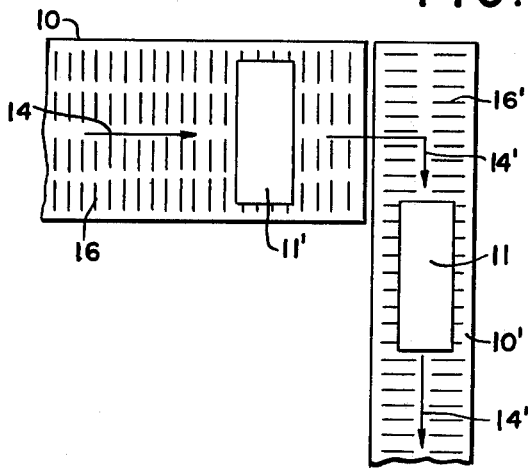
FIG. 4 is a diagrammatic partial plan view of a conveyor which may be similar to that of FIG. 3, discharging onto a similar conveyor arranged transversely at the end of the first conveyor.
Figure 5:
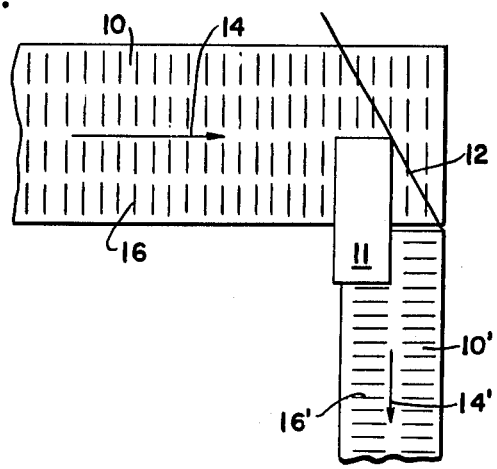
FIG. 5 is a fragmentary diagrammatic view of a conveyor similar to those of FIGS. 3 and 4, having a diverter adjacent its end and discharging on to a similar conveyor substantially normal to the first conveyor.

In FIGS. 4 and 5 there are diagrammatically shown conveyors 10 and 10'. In FIG. 4, the load 11 goes off the end of the conveyor 10, and slides easily onto the conveyor 10', the lines 16 and 16' representing the axial extent of the peripheries of the rollers, such as 16, with their axes normal to the length of the belt. The load changes direction without any appreciable drag and travels in the direction of the arrows 14'. In FIG. 5, the infeed end of the conveyor 10' is placed adjacent a side of the conveyor 10. The conveyor 10 carries the load 11 in the direction of the arrow 14 into contact with the diverter bar 12 where it slides or rolls on the rollers 16 onto the belt 10' where the rollers 16' pick it up and carry it in the direction of the arrow 14'.

Figure 6:
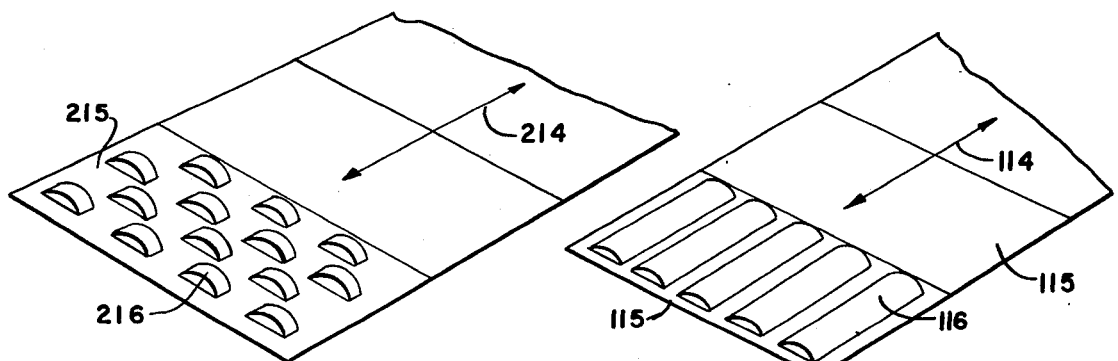
FIG. 6 is an axonometric fragmentary view of a belt conveyor similar to that of FIG. 3, but having rollers elongated to substantially the width of the belt plates with their axes in the direction of movement.

In FIG. 6, the belt plates 115 have rollers 116 with axes extending in the direction of movement of the belt, as shown by the arrow 114.

Figure 7:
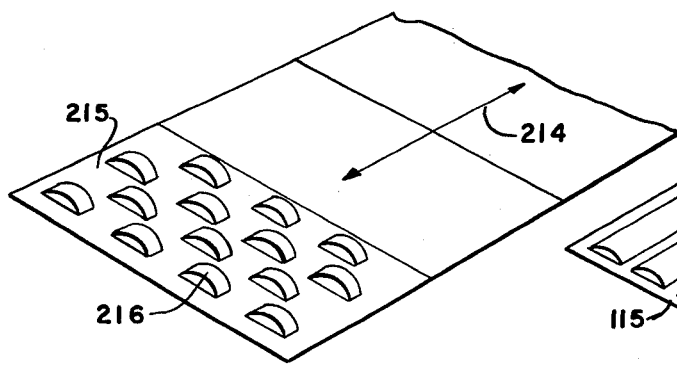
FIG. 7 is a similar axonometric view of a bit in which rollers are staggered in alternate rows.

In FIG. 7, the rollers 216 in the plates 215 are similar to the rollers 16, but are arranged in staggered rows.

Figure 8:
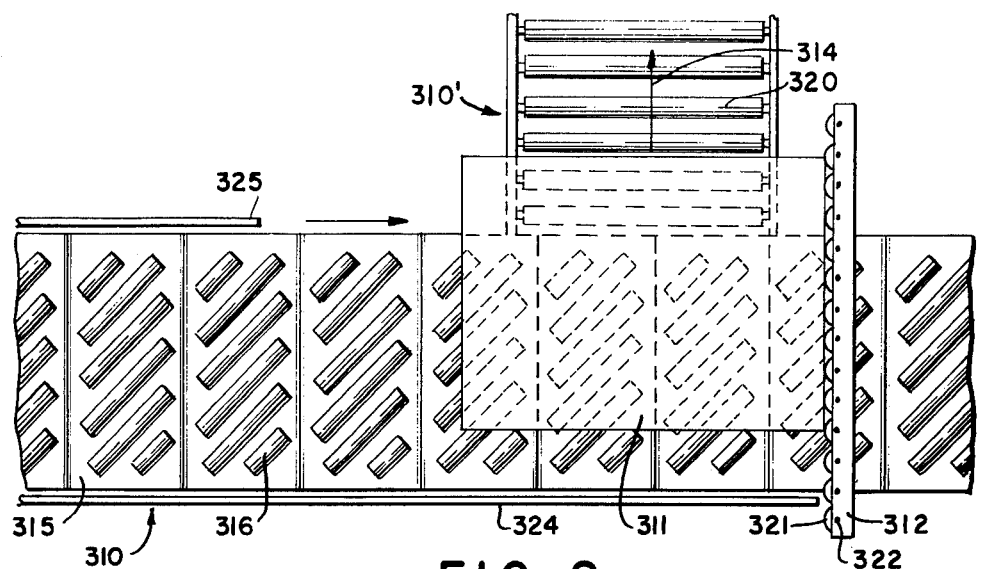
FIG. 8 is a fragmentary plan view of a belt conveyor formed of interconnected plates having rollers arranged at an angle to the direction of movement, and a diverter arranged to transfer a load to a conveyor substantially normal to the first conveyor.
Figure 9:
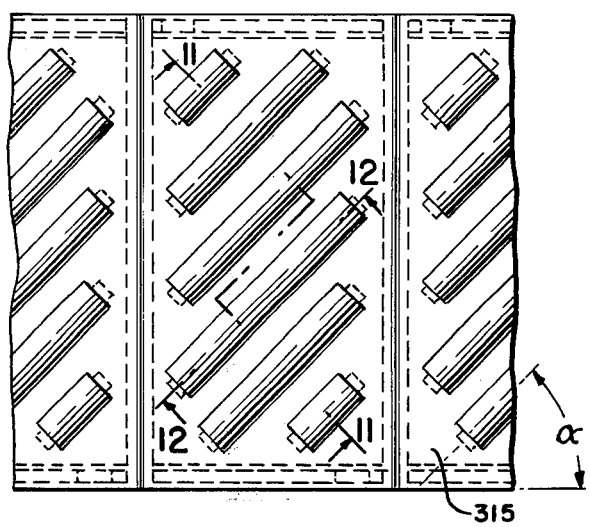
FIG. 9 is an enlarged plan view of some of the plates of the belt.
Figure 10:
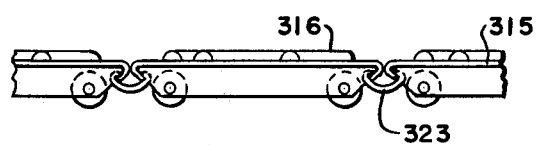
FIG. 10 is a side elevation of the structure in FIG. 9.
Figure 12:
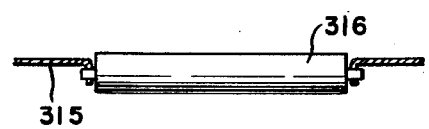
FIG. 12 is a vertical section on the line 12—12 of FIG. 9.
Figure 11:
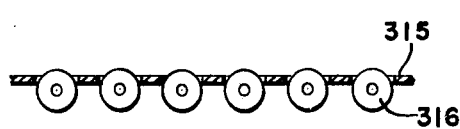
FIG. 11 is a vertical section on the line 11—11 of FIG. 9.
Figure 14:
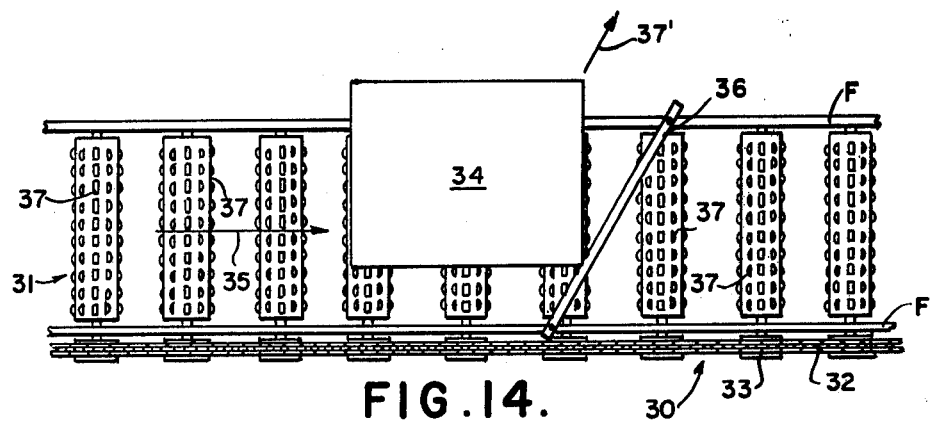
FIG. 14 is a fragmentary view of a roller conveyor having the improvements of this invention.

In FIGS. 8 and 9, I show somewhat diagrammatically a conveyor 310, having plates 315 and rollers 316, and carrying a load 311. The rollers 316 have their axes at an angle $\alpha$ to the direction of travel, as shown in FIG. 9. AT a suitable location, a take-off conveyor 310', shown as a roller conveyor, having rollers 320, is arranged. In a position to be engaged by the load 311. I place a diverter bar 312, having its load engaging face covered with rollers 321, with axes 322 extending toward the conveyor 310. This arrangement causes the load 311 to move easily, with little friction, onto the conveyor 310'. FIG. 10 is an elevation of a portion of the conveyor 310 showing the plates 315 linked together by means of the C-shaped members 323 substantially as shown in my patent above referred to. It is to be understood here that other types of endless conveyors may be used here, such as chain and slat conveyors with rollers mounted in or on the slats in the same manner that they are mounted on the belt described above. The section in FIG. 11 is taken on the line 11—11 of FIG. 9, and the view in FIG. 12 is a section on the line 12—12 of FIG. 9, both showing in end view and elevation the relation of the rollers 316 in the plates 315. Experimentation has shown that the angle $\alpha$ should be not less than about 12°. The drag here is quite insignificant, as low as about 3% of the load. Of course, there is no turning of the load. To prevent unintentional diversion of a load, side rails 324, 325 are employed.

Figure 13:
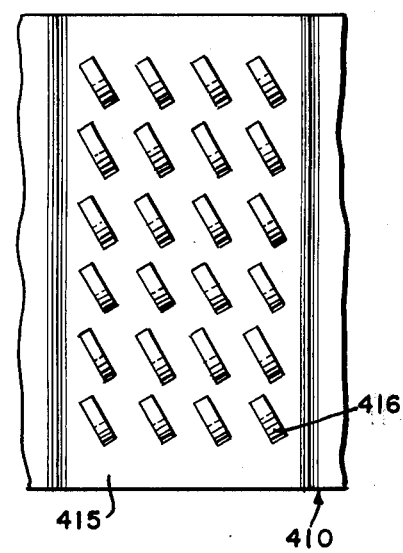
FIG. 13 is a plan view of a plate having rollers arranged on axes at angles to the direction of movement.

The plate 415 shown in FIG. 13 has rows of rollers 416, with their axes arranged at an angle to the direction of movement of the belt 410. The operation of this device is similar to that in FIGS. 8 and 9.

Figure 15:
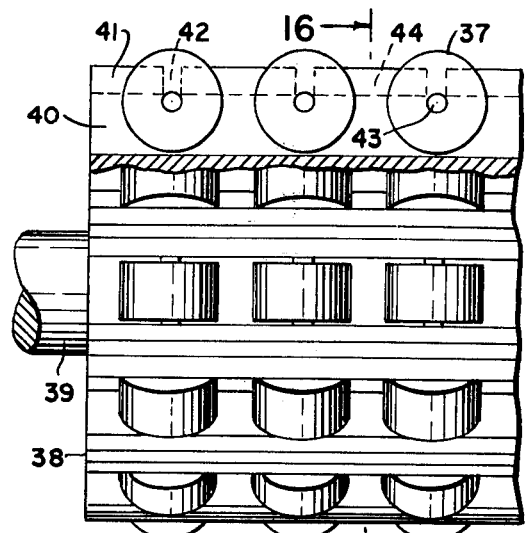
FIG. 15 is a fragmentary elevation, partly in section, of a roller for the conveyor of FIG. 14.
Figure 16:
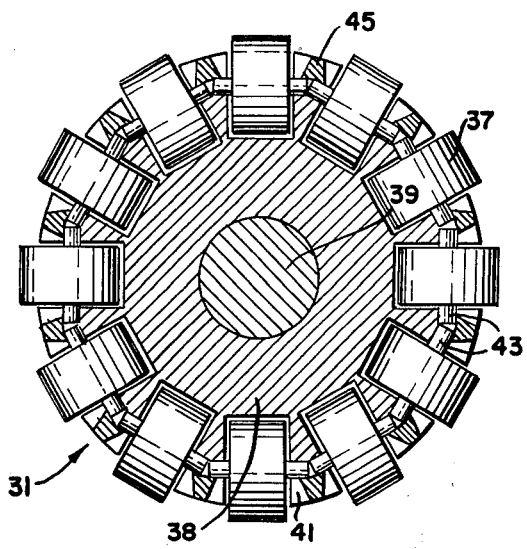
FIG. 16 is a vertical section on the line 16—16 of FIG. 15.
Figure 17:
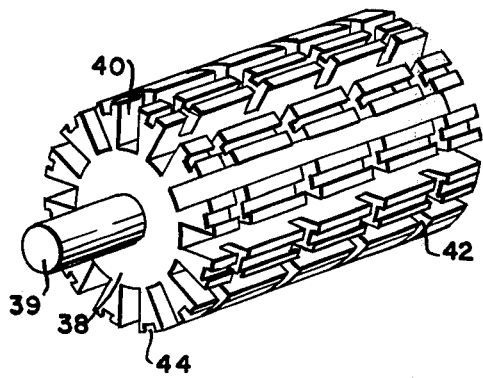
FIG. 17 is a fragmentary axonometric view of the basic roller of FIG. 15.

In FIGS. 14 to 20, I show a different type of conveyor with means to reduce friction and drag when diverting a load from the normal direction of travel. Here the roller conveyor 30 has rollers 31 mounted in frames F driven by the chain and sprocket drive means 32, 33. A load 34 will move in the direction of the arrow 35 until it contacts the diverter 36. The rolls 37 in the rollers 31 cause the load to travel in the direction of the arrow 37' with little friction. The preferred structure of the rollers 31 is shown in FIGS. 15, 16 and 17. A core 38 is fixedly mounted on the shaft 39, to which one of the sprockets 33 is attached. The core 38 is grooved axially as at 40, leaving intermediate axially extending ribs 41. Annular grooves 42 are cut in the ribs 41 and accommodate the axes 43 of the rolls 37. Keystone-shaped grooves 44 are formed in the ribs 41 and splines 45 are forced therein to hold the shafts 43 in place. As the rollers 31 rotate, clockwise in FIG. 14, the load 34 is moved toward the diverter bar 36. Contact with the bar 36 causes the load to travel on the rolls 37 and to move in the direction of the arrow 37'.

Figure 18:
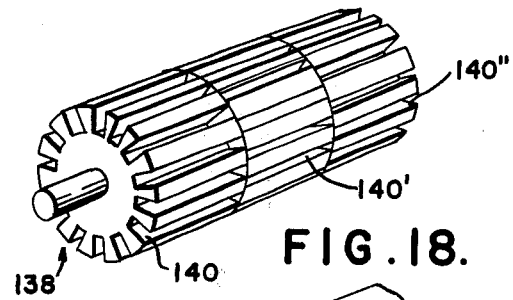
FIGS. 18 and 19 are fragmentary axonometric views of modified basic rollers as that of FIG. 15.

In FIG. 18, a core 138 for a roller 131 is shown having several series of grooves 140, 140' and 140" each staggered circumferentially from another, and a shaft 139.

Figure 19:
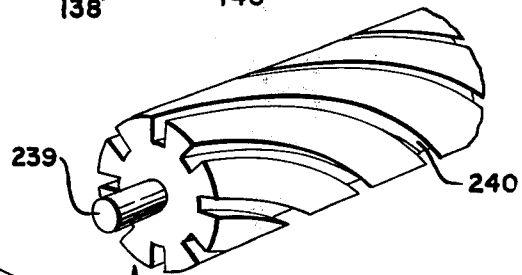
Figure 20:
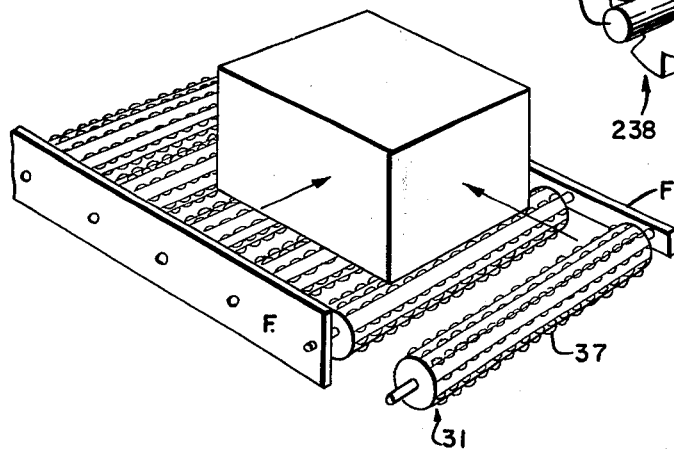
FIG. 20 is a fragmentary axonometric view of a portion of the conveyor of FIG. 14.

In FIG. 19, I show a further modified core 238 on a shaft 239 and having spirally arranged grooves 240.

Figure 21:
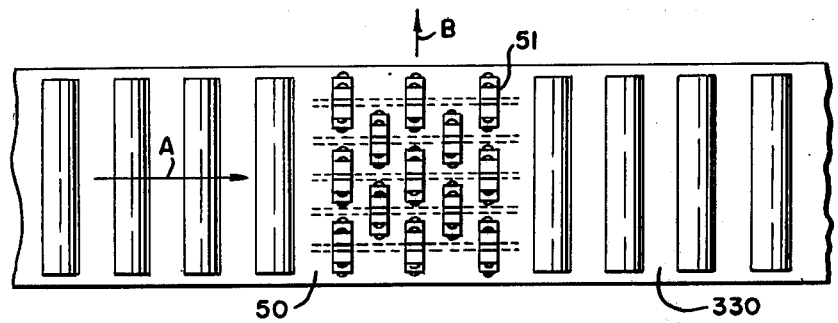
FIG. 21 is a fragmentary plan view of a roller conveyor having a load diverter section using different rollers.
Figure 22:
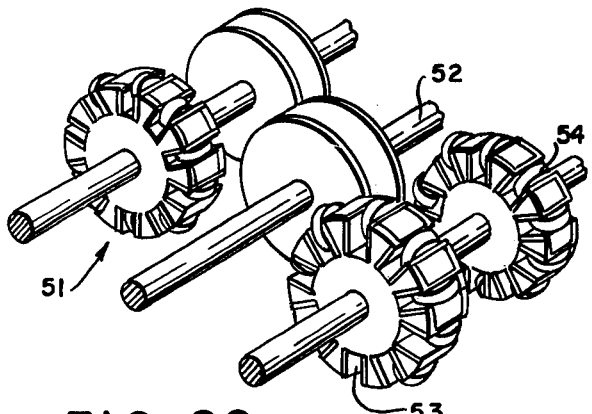
FIG. 22 is an axonometric view of a portion of the diverter roll assembly.
Figure 23:
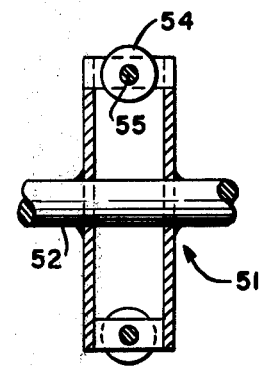
FIG. 23 is a vertical axial section through one of the rollers of FIG. 22.
Figure 24:
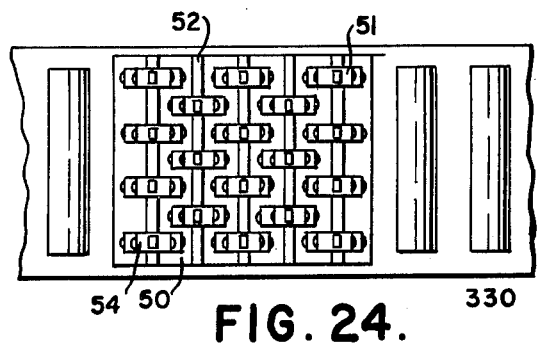
FIG. 24 is a fragmentary plan view of a conveyor similar to that in FIG. 21, having the diverter assembly differently arranged.

In FIGS. 21 and 24, I show two roller conveyors 330, each having a diverter or transfer section. In the conveyor 330 of FIG. 21, the diverter section 50 has wheels 51 arranged thereon, with their axes arranged along the direction of movement of a load, as indicated by the arrow A. The wheels 51 are provided with axially extending grooves 53, in which are located rolls 54, having axes 55 suitably mounted in the walls of the grooves. The same wheels 51 and rolls 54 appear in the diverter section 50 of FIG. 24 as in the section 50 of FIG. 21 but with their axes 52 substantially normal to the direction they occupy in FIG. 21.

Figure 25:
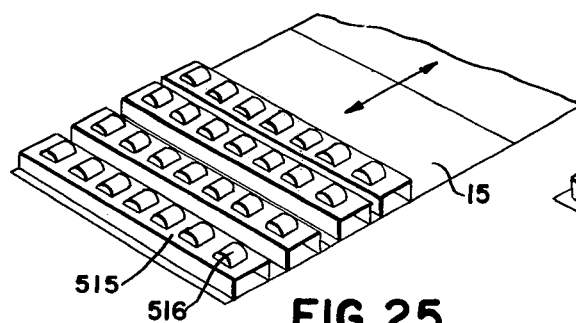
FIG. 25 is a fragmentary axonometric view of a belt conveyor, similar to those in FIGS. 1–6, having a different load diverter roller arrangement.
Figure 26:
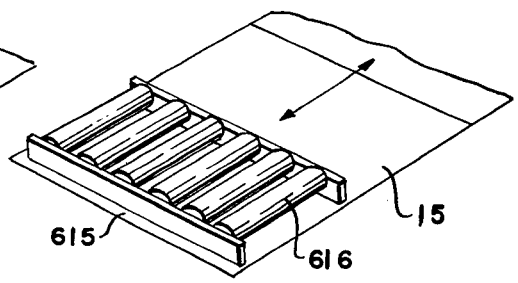
FIG. 26 is a fragmentary axonometric view of a conveyor belt plate having parallel bars thereon for supporting diverter rollers.

The devices of FIGS. 25 and 26 are similar respectively to those of FIGS. 5 and 6. Here in FIG. 25 the rollers 516 are mounted in inverted channels 515, of in the plates 15. In FIG. 26 the rollers 616 are mounted in bars 615 attached to the plates 15, instead of being in the plates 15.

Figure 27:
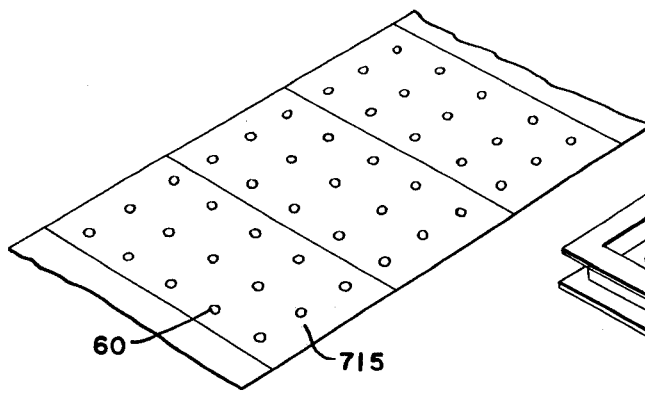
FIG. 27 is a fragmentary axonometric view of a belt conveyor similar to the ones in FIGS. 1–6, having openings for passage of a gas.
Figure 28:
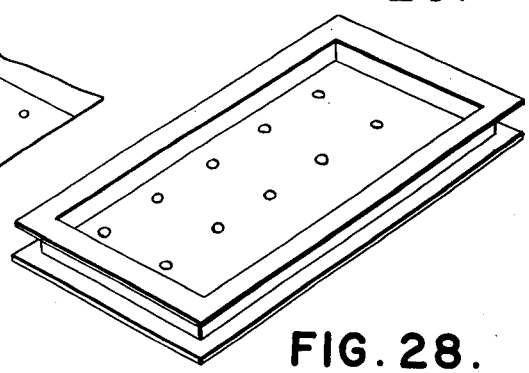
FIG. 28 is an axonometric view of a single belt link.
Figure 29:
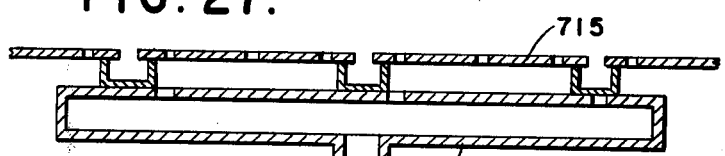
FIG. 29 is a section through a belt conveyor with means for passage of a gas.

In FIG. 27, the plates 715 have perforations 60 therein for passage of air or gas therethrough when the belt passes over an air box such as 61.

Figure 30:
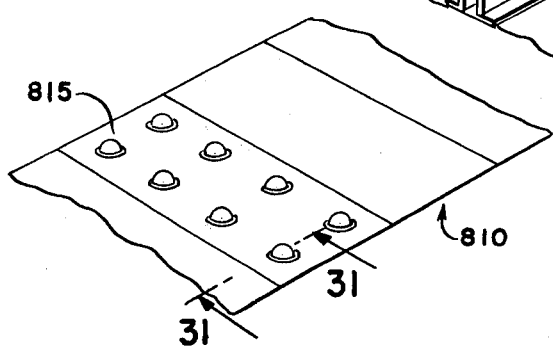
FIG. 30 is a fragmentary axonometric view of a belt conveyor with ball bearings used as friction reducing means in a diverter section.
Figure 31:
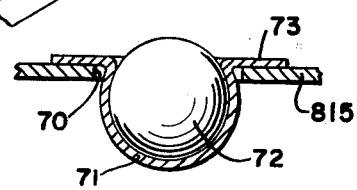
FIG. 31 is a fragmentary section on the line 31—31 of FIG. 30 looking in the direction of the arrows.

In FIG. 30, I show a modification wherein the conveyor belt plates 815 have openings 70 thereon. In these openings I place cup members 71 which are forced about balls 72 with a rolling fits. The cups 71 have flanges 73 which are welded or otherwise secured to the belt plates 815. When a load is traveling on and with the conveyor 810, and engages a suitable diverter bar, it will move substantially transversely to the direction of movement of the belt, with very little friction. The details of this mounting are shown in FIG. 31.

Figure 32:
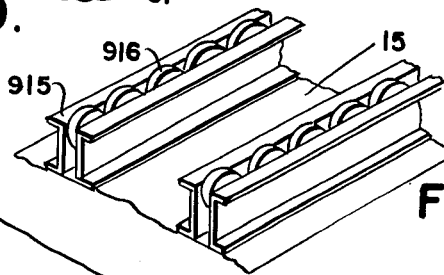
FIG. 32 is a fragmentary axonometric view of a further modification.

In FIG. 32, a further modification is shown including the plate 15 having rails 915, similar to the rails 515 or 615 in arrangement, extending in a direction normal to that representing the length of the belt made up of the plates 15. The rails 915 carry rollers 916 to reduce the friction of a load being diverted.

It is to be clearly understood that although the foregoing description has been directed to removing a load from a conveyor, the disclosed mechanism without change of design, but with slight rearrangements can operate to place a load on a conveyor, i.e., move a load from one conveyor to another substantially normal thereto.

I have shown several modified forms of conveyor means including antifriction devices incorporated therewith by virtue of which a load traveling on or with the conveyor may be moved laterally off the conveyor with materially reduced friction or drag. This results in much reduced wear on the conveyor elements.

While numerous modifications are shown, it is to be understood that various and other modifications may be made within the skill of the art and the scope of the appended claims.

I claim:

1. A conveyor system, comprising: an input article conveyor having an article conveying direction; an article transfer support adjacent and aligned in the conveying direction with said first article conveyor; diverter abutment means for engaging articles being moved onto said article transfer support by said first article conveyor and providing a component of force to said articles transverse to said article conveying direction; said diverter abutment means providing a stationary article surface generally lying within a vertical plane intersecting the conveying direction of said first article conveyor means at an acute angle; said article tranfer support having a plurality of first rollers mounted transversely of the conveying direction for rotation about axes generally parallel with each other; a plurality of second rollers mounted on each of said first rollers for rotation about axes transverse to the axes of said first rollers; and said second rollers being mounted around the periphery of said first rollers so that the upper-most ones of said second rollers have upper-most surfaces lying within a common article support plane spaced above the upper-most surface of said first rollers and being generally coplanar with the article supporting surface of said first article conveyor.

2. The conveyor system of claim 1, wherein said input article conveyor comprises a plurality of rollers extending the full width of its article supporting surface and being mounted for rotation about axes parallel with each other and said transfer support first rollers.

3. The conveyor system of claim 2, wherein said transfer support first rollers are mounted in groups spaced from each other in said article conveying direction, with each group comprising a plurality of coaxially spaced individual first rollers.

4. The conveyor system of claim 3, wherein the first rollers of alternate groups are respectively aligned in the article conveying direction with each other and the first rollers of adjacent groups are laterally staggered with respect to the article conveying direction.

5. The conveyor system of claim 4, wherein the first rollers of adjacent groups overlap each other in the article conveying direction.

6. The conveyor system of claim 1, wherein said transfer first rollers extend for the full width of the input article conveyor; and said second rollers are mounted in rows parallel with the first roller axis and in peripheral groups lying in common planes, respectively, perpendicular to the axes of the first rollers.

7. The conveyor system of claim 1, wherein each of said first rollers includes a solid roller body having a plurality of channels spaced around its periphery and extending for its full axial width, and a plurality of said second rollers being mounted in each of said channels with their axes perpendicular to and extending through the sides of said channels.

8. The conveyor system of claim 1, wherein each of said first rollers includes a body made up of a plurality of axially adjacent sections, each section having a plurality of peripherally evenly spaced channels extending across its full width, with the channels of adjacent sections being misaligned; and a plurality of said second rollers being mounted within each of said channels with their axes perpendicular to the extent of said channels and being spaced along said channels.

9. The conveyor system of claim 1, wherein each of said first rollers includes a roller body having a plurality of peripherally evenly spaced channels, each spirally extending around its surface and across its full axial extent; and a plurality of said second rollers being mounted within each of said channels with their axes generally perpendicular to the extent of said channels.

10. The conveyor system of claim 1, wherein said first rollers are mounted in groups, with each group having a plurality of coaxial first rollers axially aligned with the article conveying direction, with alternate groups having coplanar rollers and adjacent groups having staggered overlapping rollers.

* * * * *